United States Patent
Chien (10) Patent No.: US 10,410,792 B2
(45) Date of Patent: Sep. 10, 2019

(54) METHOD OF MANUFACTURING A THIN FILM CAPACITOR

(71) Applicant: APAQ TECHNOLOGY CO., LTD., Miaoli County (TW)

(72) Inventor: Ming-Goo Chien, Taichung (TW)

(73) Assignee: APAQ TECHNOLOGY CO., LTD., Miaoli County (TW)

(*) Notice: Subject to any disclaimer, the term of this patent is extended or adjusted under 35 U.S.C. 154(b) by 39 days.

(21) Appl. No.: 15/383,830

(22) Filed: Dec. 19, 2016

(65) Prior Publication Data
US 2018/0047510 A1  Feb. 15, 2018

(30) Foreign Application Priority Data

Aug. 10, 2016 (TW) ............................ 105125433 A (51) Int. Cl.
*H01G 4/33* (2006.01)
*H01G 4/005* (2006.01)
(Continued)

(52) U.S. Cl.
CPC .............. *H01G 4/33* (2013.01); *H01G 4/005* (2013.01); *H01G 4/018* (2013.01); *H01G 4/232* (2013.01); *H01G 4/248* (2013.01); *H01G 4/30* (2013.01); *H01G 4/306* (2013.01); *H01G 13/00* (2013.01); *H01G 13/006* (2013.01);
(Continued)

(58) Field of Classification Search
CPC .......... H01G 4/33; H01G 4/306; H01G 4/005; H01G 4/018; H01G 4/232; H01G 4/248; H01G 4/30; H01G 13/006; H01G 13/00; H01G 13/003; Y10T 29/5136; Y10T 29/5196; Y10T 29/5317; Y10T 29/53187
See application file for complete search history.

(56) References Cited

U.S. PATENT DOCUMENTS

| 4,381,321 A * | 4/1983 | Braden ................... B05D 1/00 427/101 |
| 4,741,077 A * | 5/1988 | Langlois ................ H01G 4/232 204/192.15 |

(Continued)

FOREIGN PATENT DOCUMENTS

JP  2001-196279  *  7/2001  ............. H01G 13/00

*Primary Examiner* — Peter Dungba Vo
*Assistant Examiner* — Jeffrey T Carley
(74) *Attorney, Agent, or Firm* — Li & Cai Intellectual Property (USA) Office (57) ABSTRACT

The instant disclosure provides a thin film capacitor and a method of manufacturing the same. The method includes the following steps: placing a carrier substrate on a processing machine including at least one processing unit, and the at least one processing unit having a metal-layer forming module and an insulation-layer forming module that are arranged along a planar production line; forming a plurality of metal layers by the metal-layer forming module of the at least one processing unit, forming a plurality of insulation layers by the insulation-layer forming module of the at least one processing unit, and the metal layers and the insulation layers being alternately stacked on the carrier substrate to form a multilayer stacked structure; and then forming two terminal electrode structures to respectively enclose two opposite side end portions of the multilayer stacked structure.

10 Claims, 10 Drawing Sheets

(51) Int. Cl.
  *H01G 4/018*  (2006.01)
  *H01G 4/248*  (2006.01)
  *H01G 13/00*  (2013.01)
  *H01G 4/30*   (2006.01)
  *H01G 4/232*  (2006.01)

(52) U.S. Cl.
  CPC ........ *H01G 13/003* (2013.01); *Y10T 29/5136* (2015.01); *Y10T 29/5137* (2015.01); *Y10T 29/5196* (2015.01); *Y10T 29/53187* (2015.01)

(56) References Cited

U.S. PATENT DOCUMENTS

| | | | | |
|---|---|---|---|---|
| 5,576,925 A * | 11/1996 | Gorowitz | ............... | H01G 4/306 361/301.2 |
| 5,922,168 A * | 7/1999 | Zablotny | ............... | H01G 4/308 156/361 |
| 6,576,523 B1 * | 6/2003 | Honda | ............... | C23C 14/042 257/298 |
| 7,251,122 B2 * | 7/2007 | Hinoki | ............... | H01G 9/016 361/502 |
| 2002/0014202 A1 * | 2/2002 | Onodera | ............ | H01G 13/006 118/413 |
| 2003/0087037 A1 * | 5/2003 | Honda | ............... | C23C 14/042 427/404 |
| 2004/0200577 A1 * | 10/2004 | Onodera | ............ | H01G 13/006 156/750 |
| 2009/0279227 A1 * | 11/2009 | Ha | ............... | H01G 4/008 361/301.4 |
| 2011/0032656 A1 * | 2/2011 | Ito | ............... | H01G 4/145 361/301.4 |
| 2016/0049258 A1 * | 2/2016 | Kojima | ............... | H01G 4/385 361/301.4 |

* cited by examiner

METHOD OF MANUFACTURING A THIN FILM CAPACITOR

BACKGROUND OF THE INVENTION

1. Field of the Invention

The instant disclosure relates to a capacitor and a method of manufacturing the same, and more particularly to a thin film capacitor and a method of manufacturing the same.

2. Description of Related Art

Various applications of capacitors include home appliances, computer motherboards and peripherals, power supplies, communication products and automobiles. The capacitors such as solid electrolytic capacitors or thin film capacitors are mainly used to provide filtering, bypassing, rectifying, coupling, blocking or transforming function. Because the thin film capacitor has the advantages of small size, large electrical capacity and good frequency characteristic, it can be used as a decoupling element in the power circuit. However, the method of manufacturing the thin film capacitor is too complex.

SUMMARY OF THE INVENTION

In one aspect, the invention relates to a thin film capacitor and a method of manufacturing the same.

One of the embodiments of the instant disclosure provides a method of manufacturing a thin film capacitor, comprising: placing a carrier substrate on a processing machine, wherein the processing machine includes a plurality of processing units sequentially arranged along a planar production line, and each processing unit has a metal-layer forming module and an insulation-layer forming module; coating a first metal layer on the carrier substrate by the metal-layer forming module of a first processing unit of the processing units; coating a first insulation layer on the carrier substrate to cover the first metal layer by the insulation-layer forming module of the first processing unit; sequentially performing N repeat processing steps to finish a multilayer stacked structure, wherein each repeat processing step is respectively defined as $1^{st}$, $2^{nd}$, $3^{rd}$, ..., $(N)^{th}$ repeat processing step; and then forming two terminal electrode structures to respectively enclose two opposite side end portions of the multilayer stacked structure. Each repeat processing step includes coating a $(N+1)^{th}$ metal layer on a $(N)^{th}$ insulation layer to cover a $(N)^{th}$ metal layer by the metal-layer forming module of a $(N+1)^{th}$ processing unit of processing units, and then coating a $(N+1)^{th}$ insulation layer on the $(N)^{th}$ insulation layer to cover the $(N+1)^{th}$ metal layer by the insulation-layer forming module of the $(N+1)^{th}$ processing unit.

Another one of the embodiments of the instant disclosure provides a method of manufacturing a thin film capacitor, comprising: placing a carrier substrate on a processing machine, wherein the processing machine includes at least one processing unit, and the at least one processing unit has a metal-layer forming module and an insulation-layer forming module that are arranged along a planar production line; forming a plurality of metal layers by the metal-layer forming module of the at least one processing unit, and forming a plurality of insulation layers by the insulation-layer forming module of the at least one processing unit, wherein the metal layers and the insulation layers are alternately stacked on the carrier substrate to form a multilayer stacked structure; and then forming two terminal electrode structures to respectively enclose two opposite side end portions of the multilayer stacked structure.

Yet another one of the embodiments of the instant disclosure provides a thin film capacitor, comprising: a multilayer stacked structure and two terminal electrode structures. The multilayer stacked structure is formed by a processing machine. The two terminal electrode structures are used to respectively enclose two opposite side end portions of the multilayer stacked structure. The multilayer stacked structure includes a carrier substrate, a plurality of metal layers and a plurality of insulation layers, and the metal layers and the insulation layers are alternately stacked on the carrier substrate. The processing machine includes a plurality of processing units sequentially arranged along a planar production line, and each processing unit has a metal-layer forming module for forming the corresponding metal layer and an insulation-layer forming module for forming the corresponding insulation layer.

Therefore, the metal layers and the insulation layers are alternately stacked on the carrier substrate to form the multilayer stacked structure of the thin film capacitor due to the features of "the processing machine including a plurality of processing units arranged along a planar production line" and "each processing unit having a metal-layer forming module for forming the metal layer and an insulation-layer forming module for forming the insulation layer".

To further understand the techniques, means and effects of the instant disclosure, the following detailed descriptions and appended drawings are hereby referred to, such that, and through which, the purposes, features and aspects of the instant disclosure can be thoroughly and concretely appreciated. However, the appended drawings are provided solely for reference and illustration, without any intention to limit the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DETAILED DESCRIPTION OF THE PREFERRED EMBODIMENTS

Embodiments of a thin film capacitor and a method of manufacturing the same according to the instant disclosure are described herein. Other advantages and objectives of the instant disclosure can be easily understood by one skilled in the art from the disclosure. The instant disclosure can be applied in different embodiments. Various modifications and variations can be made to various details in the description for different applications without departing from the scope of the instant disclosure. The drawings of the instant disclosure are provided only for simple illustrations, but are not drawn to scale and do not reflect the actual relative dimensions. The following embodiments are provided to describe in detail the concept of the instant disclosure, and are not intended to limit the scope thereof in any way.

Referring to FIG. 1 to FIG. 8, the instant disclosure provides a method of manufacturing a thin film capacitor Z, comprising the following steps: first, referring to FIG. 1 to FIG. 5, placing a carrier substrate 10 on a processing machine M, the processing machine M including a plurality of processing units R sequentially arranged along a planar (plane type) production line, and each processing unit R having a metal-layer forming module X and an insulation-layer forming module Y (S100); next, referring to FIG. 1, FIG. 2, FIG. 3 and FIG. 5, coating a first metal layer 11 on the carrier substrate 10 by the metal-layer forming module X of a first processing unit R(R1) of the processing units (S102); afterward, referring to FIG. 1, FIG. 2, FIG. 3 and FIG. 5, coating a first insulation layer 12 on the carrier substrate 10 to cover the first metal layer 11 by the insulation-layer forming module Y of the first processing unit R(R1) (S104); and then, referring to FIG. 1, FIG. 4, FIG. 6 and FIG. 8, sequentially performing N repeat processing steps to finish a multilayer stacked structure 1, and each repeat processing step is respectively defined as $1^{st}$, $2^{nd}$, $3^{rd}$, . . . , $(N)^{th}$ repeat processing step.

Figure 4:
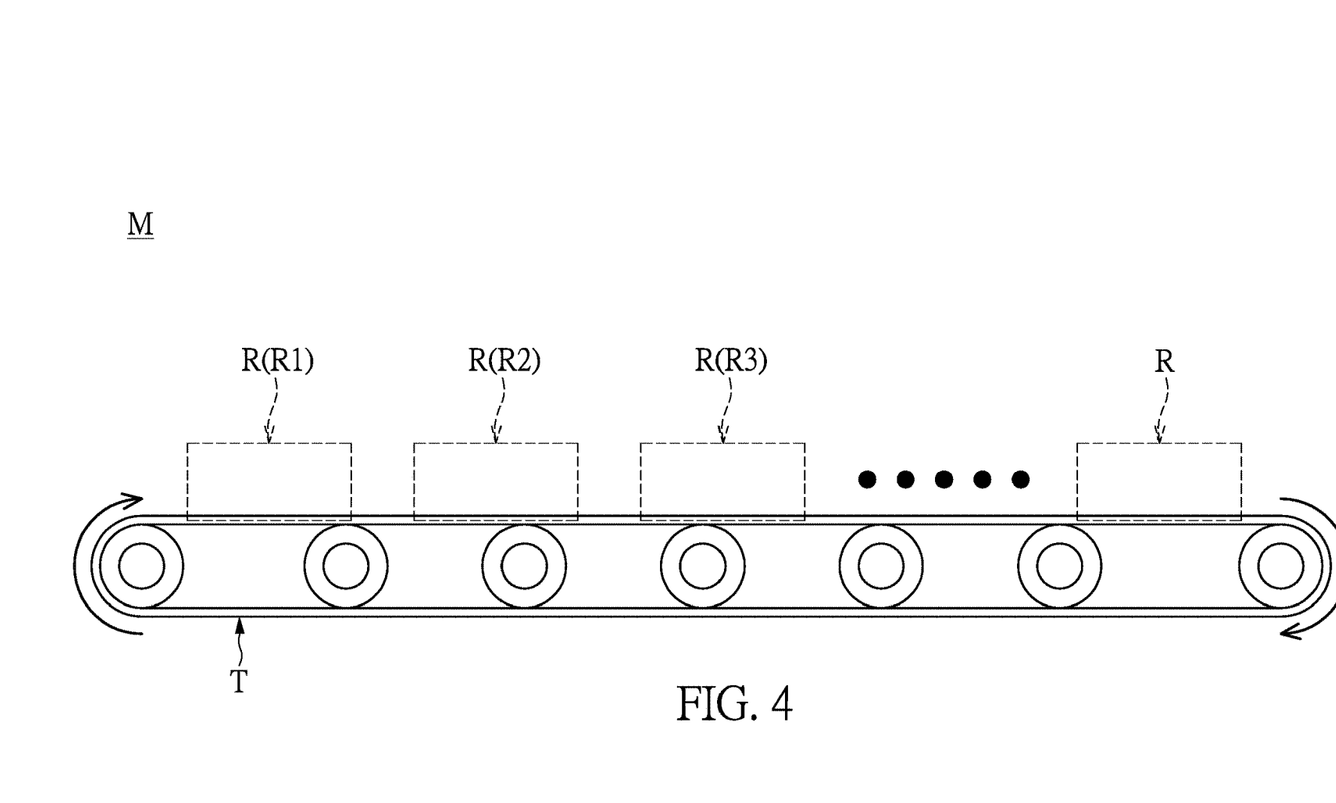
FIG. 4 shows a schematic view of the processing machine according to the instant disclosure.

First, for example, as shown in FIG. 4, the processing units R are sequentially arranged along a planar production line, and the drop height of the planar production line can be very small. In addition, the planar production line may be a linear (straight) production line or a non-linear production line, or may be a surrounding production line. Moreover, the processing machine M includes a transmission mechanism T (such as using a transmission band mated with rollers) for linearly or straightly driving the carrier substrate 10 to sequentially pass through the processing units R, and each processing unit R is placed in a room temperature environment. For example, the processing unit R can be placed in a temperature environment at approximately 25° C. without vacuum.

Figure 3:
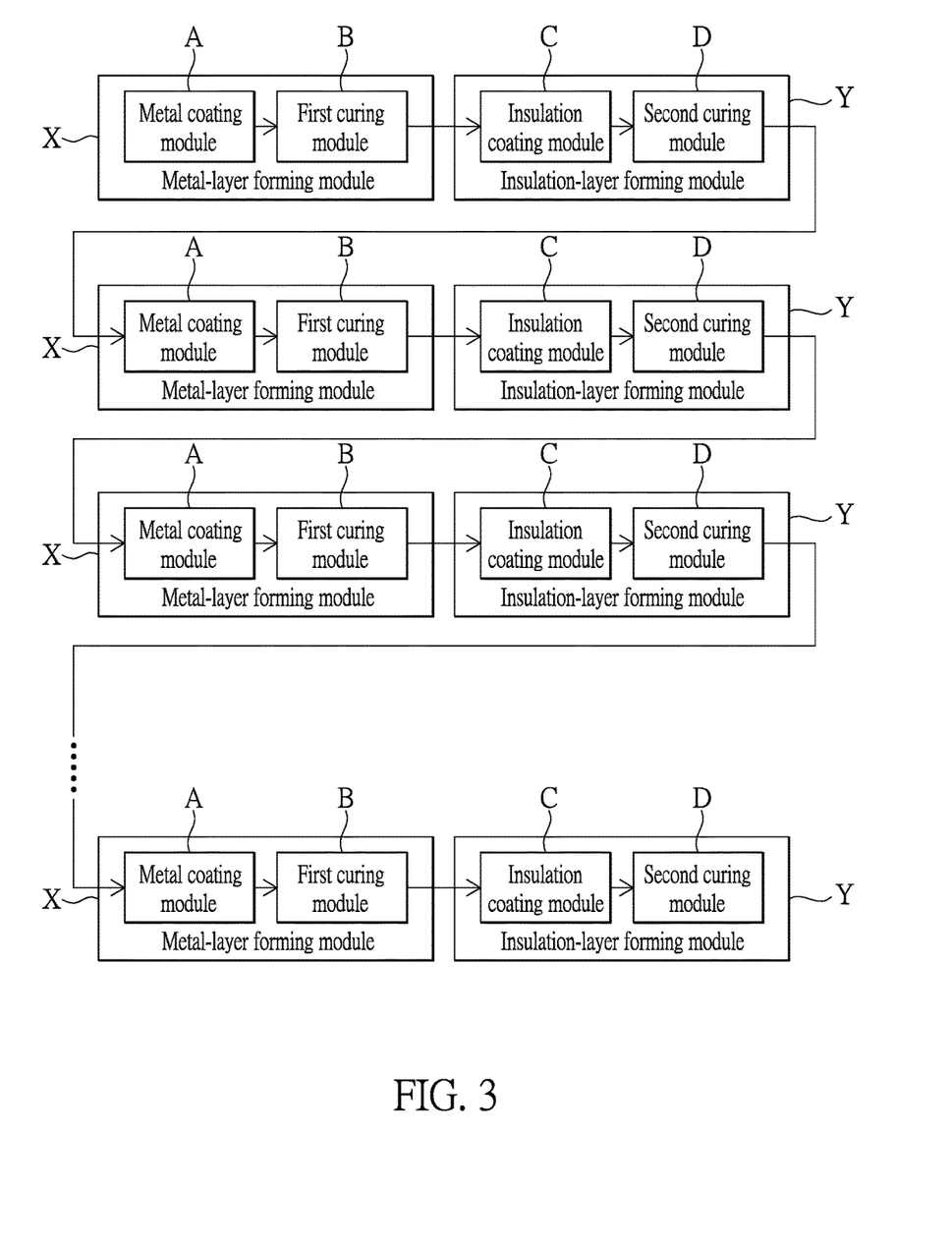
FIG. 3 shows a function block of the processing machine according to the instant disclosure.
Figure 5:
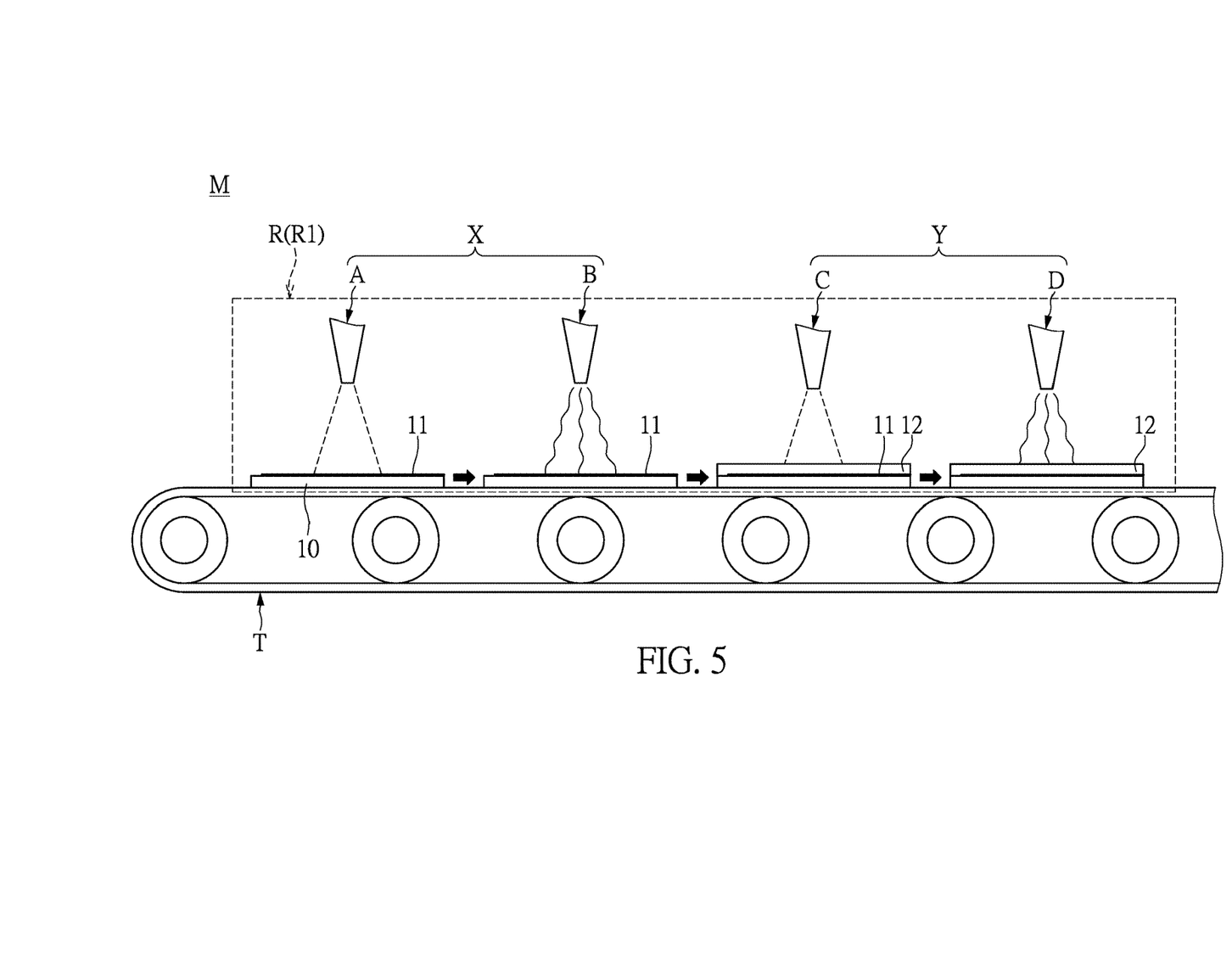
FIG. 5 shows a schematic view of the metal-layer processing module and the insulation-layer processing module of the first processing unit according to the instant disclosure.

Moreover, for example, referring to FIG. 3 and FIG. 5, each metal-layer forming module X includes a metal coating module A for forming the metal layer 11 and a first curing (or baking) module B for curing (or baking) the formed metal layer 11, and each insulation-layer forming module Y includes an insulation coating module C for forming the insulation layer 12 and a second curing (or baking) module D for curing (or baking) the insulation layer 12. Please note that the aforementioned coating module (A or C) may be replaced by a spraying module or a printing module according to different requirements.

More particularly, referring to FIG. 1 to FIG. 5, the step S102 of coating the first metal layer 11 on the carrier substrate 10 by the metal-layer forming module X of the first processing unit R(R1) further comprises the following steps: first, coating the first metal layer 11 on the carrier substrate 10 by the metal coating module A of the first processing unit R(R1) (S102a), and then curing the first metal layer 11 by the first curing module B of the first processing unit R(R1) (S102b) so as to harden the first metal layer 11.

According to the above description, referring to FIG. 1 to FIG. 5, the step S104 of coating the first insulation layer 12 on the carrier substrate 10 to cover the first metal layer 11 by the insulation-layer forming module Y of the first processing unit R(R1) further comprises the following steps: first, coating the first insulation layer 12 on the carrier substrate 10 to cover the first metal layer 11 by the insulation coating module C of the first processing unit R(R1) (S104a), and then curing the first insulation layer 12 by the second curing module D of the first processing unit R(R1) (S104b) so as to harden the first insulation layer 12.

More particularly, referring to FIG. 1 to FIG. 7, in the step of sequentially performing the N repeat processing steps, each repeat processing step includes the following steps: first, coating a $(N+1)^{th}$ metal layer 11 on a $(N)^{th}$ insulation layer 12 to cover a $(N)^{th}$ metal layer 11 by the metal-layer forming module X of a $(N+1)^{th}$ processing unit R of processing units (S106), and then coating a $(N+1)^{th}$ insulation layer 12 on the $(N)^{th}$ insulation layer 12 to cover the $(N+1)^{th}$ metal layer 11 by the insulation-layer forming module Y of the $(N+1)^{th}$ processing unit R (S108).

More particularly, referring to FIG. 1 to FIG. 7, the step S106 of coating the $(N+1)^{th}$ metal layer 11 on the $(N)^{th}$ insulation layer 12 to cover the $(N)^{th}$ metal layer 11 by the metal-layer forming module X of the $(N+1)^{th}$ processing unit R further comprises the following steps: first, coating the $(N+1)^{th}$ metal layer 11 on the $(N)^{th}$ insulation layer 12 to cover the $(N)^{th}$ metal layer 11 by the metal coating module A of the $(N+1)^{th}$ processing unit R (S106a), and then curing the $(N+1)^{th}$ metal layer 11 by the first curing module B of the $(N+1)^{th}$ processing unit R (S106b) so as to harden the $(N+1)^{th}$ metal layer 11. Moreover, the step S108 of coating the $(N+1)^{th}$ insulation layer 12 on the $(N)^{th}$ insulation layer 12 to cover the $(N+1)^{th}$ metal layer 11 by the insulation-layer forming module Y of the $(N+1)^{th}$ processing unit R further comprises the following steps: first, coating the $(N+1)^{th}$ insulation layer 12 on the $(N)^{th}$ insulation layer 12 to cover the $(N+1)^{th}$ metal layer 11 by the insulation coating module C of the $(N+1)^{th}$ processing unit R (S108a), and then curing the $(N+1)^{th}$ insulation layer 12 by the second curing module D of the $(N+1)^{th}$ processing unit R (S108b) so as to harden the $(N+1)^{th}$ insulation layer 12.

Figure 2:
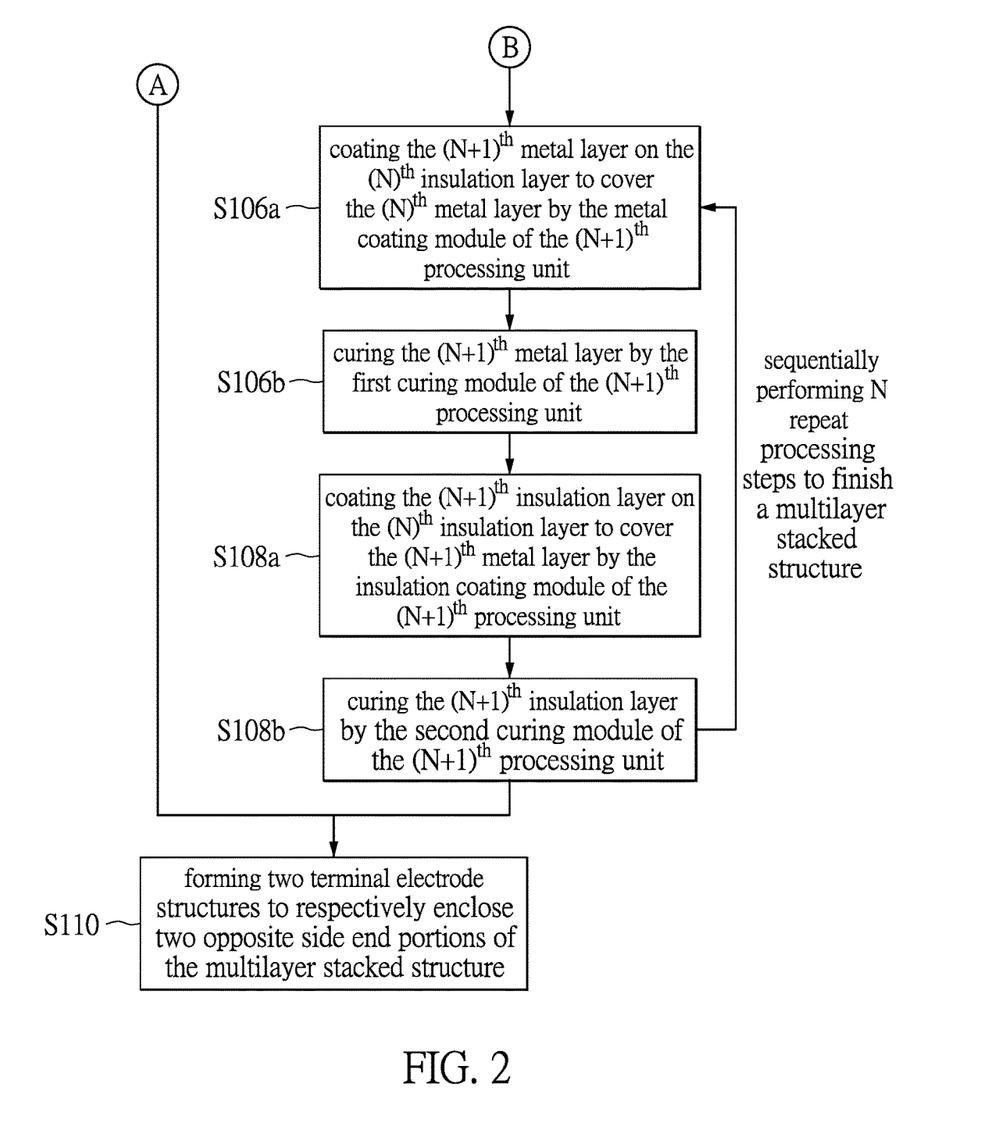
FIG. 2 shows the other flowchart of the method of manufacturing the thin film capacitor according to the instant disclosure.
Figure 6:
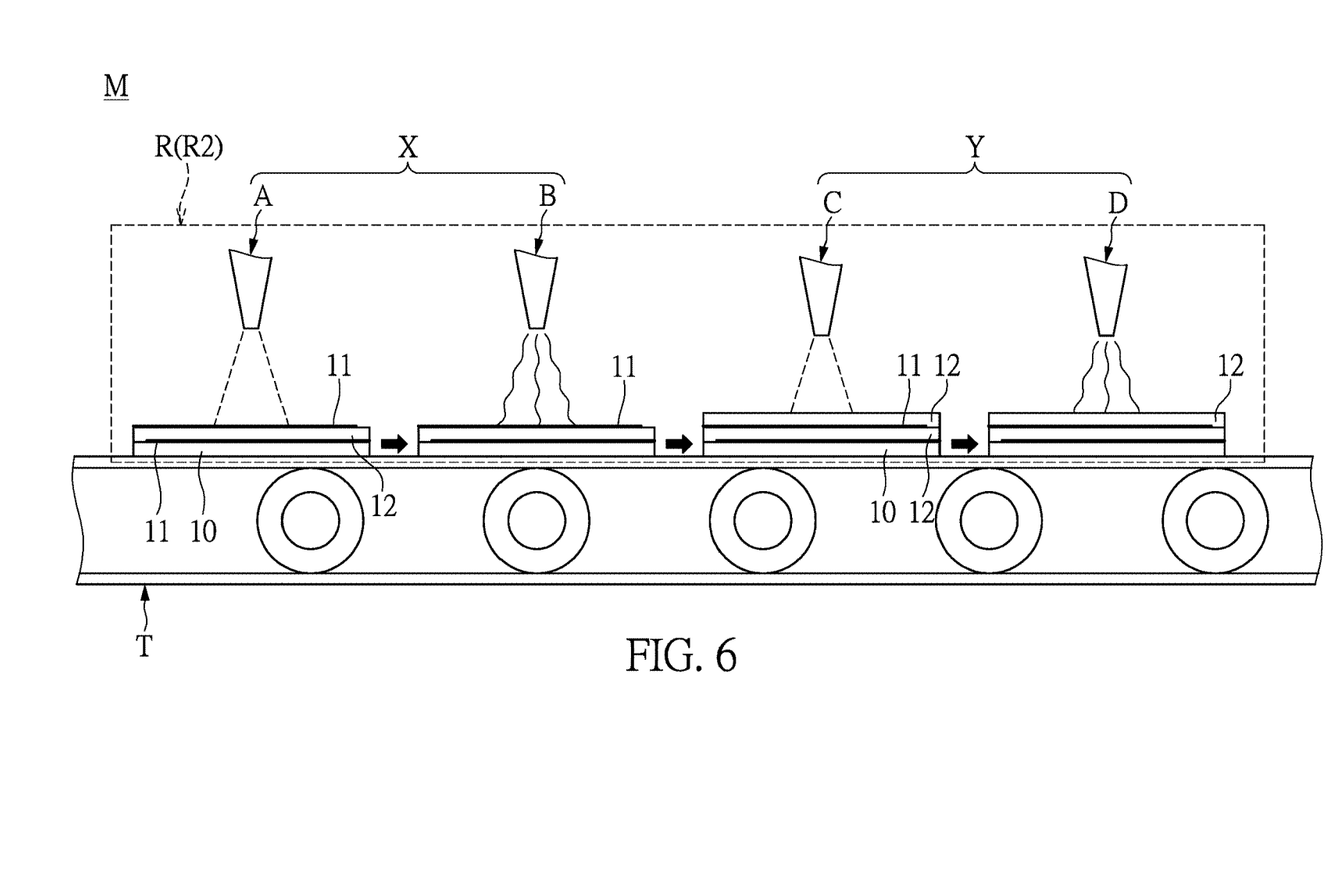
FIG. 6 shows a schematic view of the metal-layer processing module and the insulation-layer processing module of the second processing unit according to the instant disclosure.

For example, referring to FIG. 2, FIG. 4 and FIG. 6, when performing the $1^{st}$ repeat processing step (N=1), coating the second metal layer 11 on the first insulation layer 12 to cover the first metal layer 11 by the metal coating module A of the second processing unit R(R2), curing the second metal layer 11 by the first curing module B of the second processing unit R(R2) so as to harden the second metal layer 11, coating the second insulation layer 12 on the first insulation layer 12 to cover the second metal layer 11 by the insulation coating module C of the second processing unit R(R2), and then curing the second insulation layer 12 by the second curing module D of the second processing unit R(R2) so as to harden the second insulation layer 12.

Figure 7:
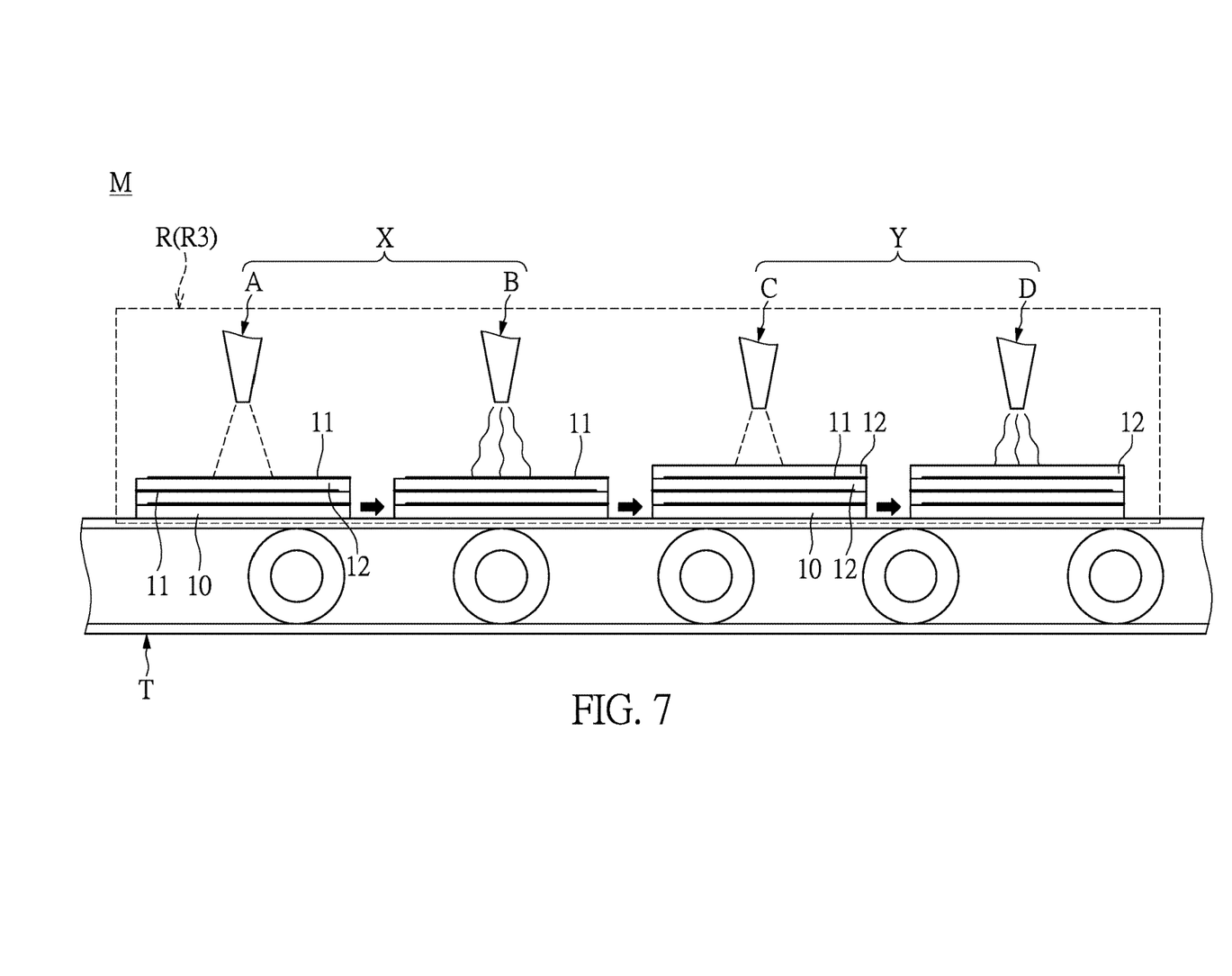
FIG. 7 shows a schematic view of the metal-layer processing module and the insulation-layer processing module of the third processing unit according to the instant disclosure.

According to the above description, referring to FIG. 2, FIG. 4 and FIG. 7, when performing the $2^{nd}$ repeat processing step (N=2), coating the third metal layer 11 on the second insulation layer 12 to cover the second metal layer 11 by the metal coating module A of the third processing unit R(R3), curing the third metal layer 11 by the first curing module B of the third processing unit R(R3) so as to harden the third metal layer 11, coating the third insulation layer 12 on the second insulation layer 12 to cover the third metal layer 11 by the insulation coating module C of the third processing unit R(R3), and then curing the third insulation layer 12 by the second curing module D of the third processing unit R(R3) so as to harden the third insulation layer 12.

Figure 1:
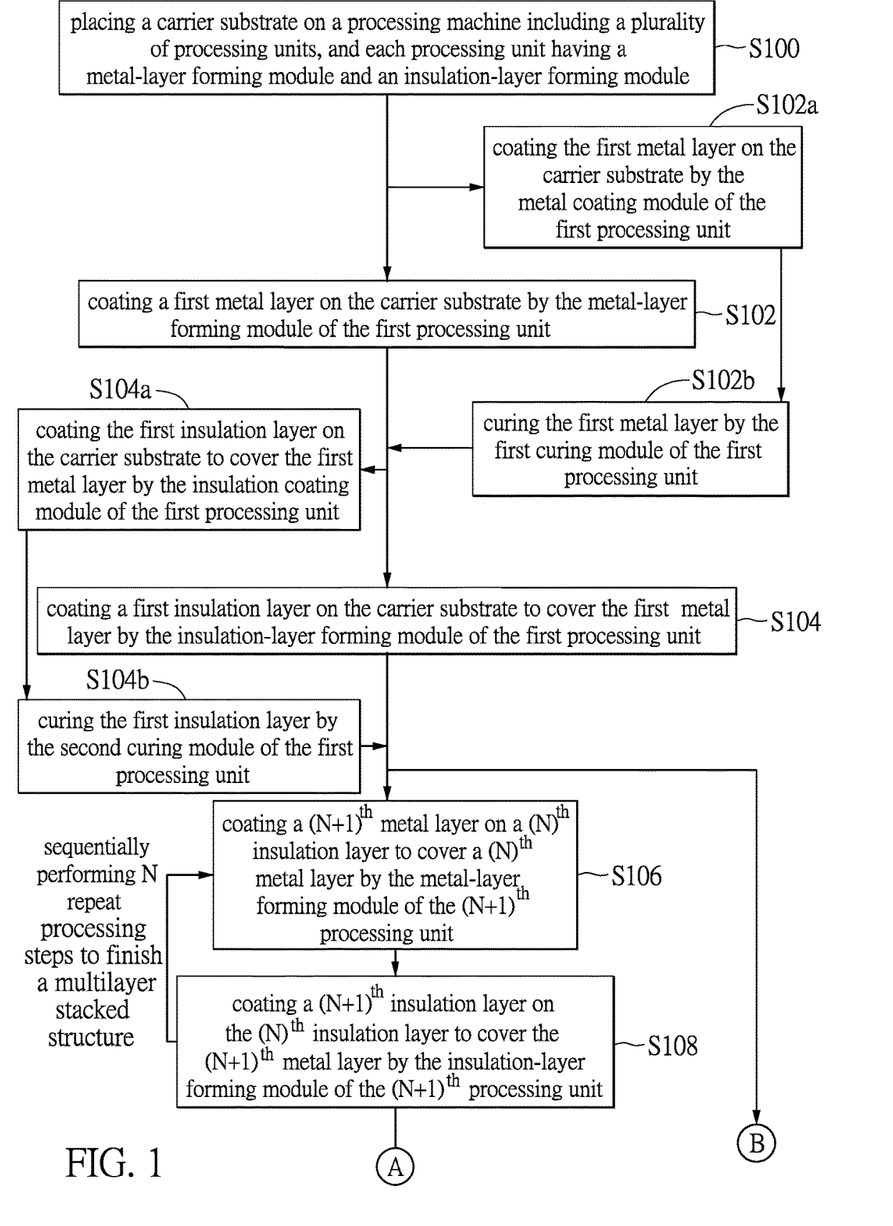
FIG. 1 shows a partial flowchart of the method of manufacturing the thin film capacitor according to the instant disclosure.
Figure 8:
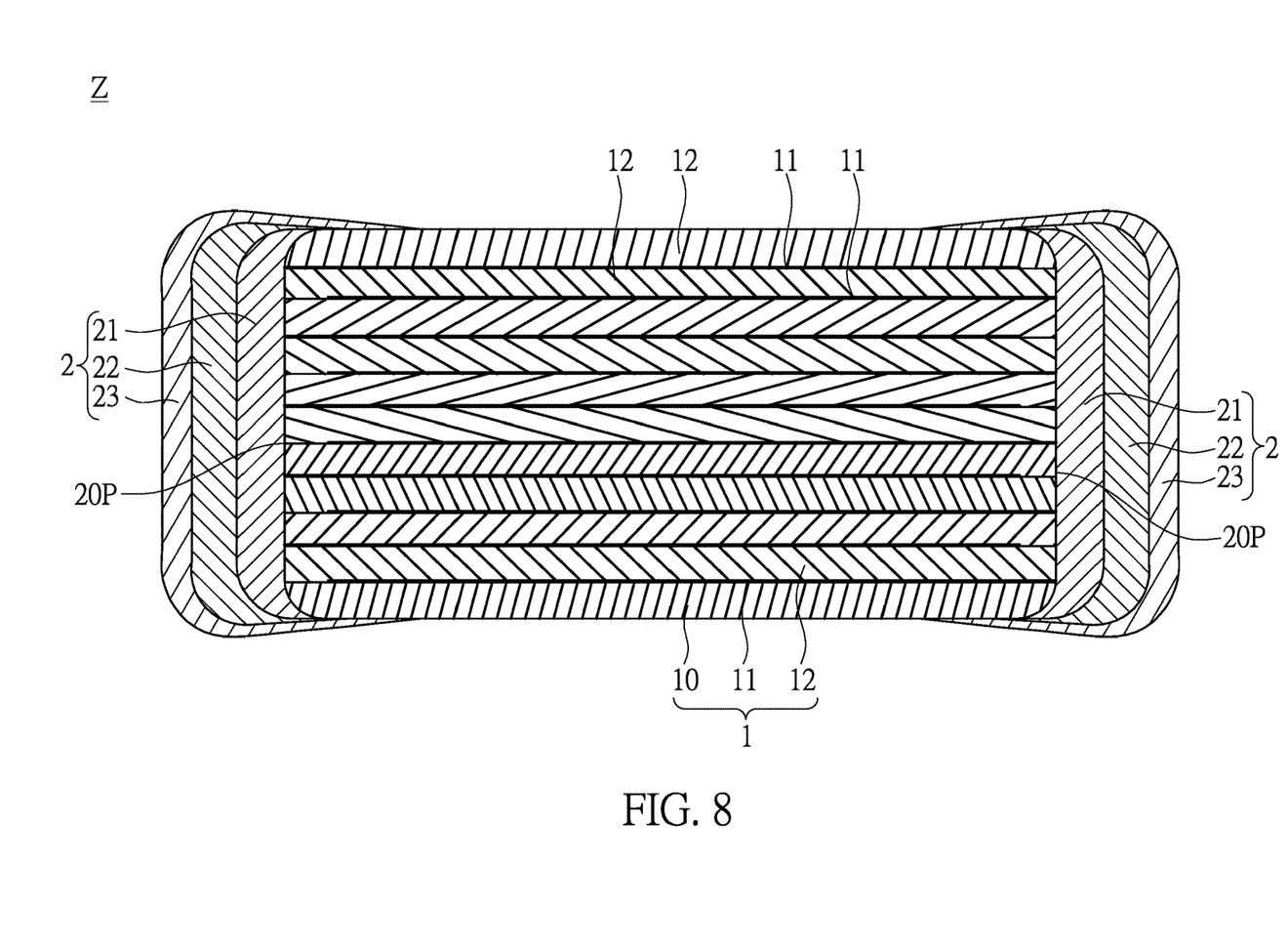
FIG. 8 shows a cross-sectional, schematic view of the thin film capacitor according to the instant disclosure.

Furthermore, referring to FIG. 1, FIG. 2 and FIG. 8, after the step of sequentially performing the N repeat processing steps, the method of the instant disclosure further comprises: forming two terminal electrode structures 2 to respectively enclose two opposite side end portions 20P of the multilayer stacked structure 1 (S110) so as to finish the manufacture of the multilayer stacked structure 1. For example, each terminal electrode structure 2 includes a first enclosing layer 21 contacting the side end portion 20P of the multilayer stacked structure 1 so as to enclose the side end portion 20P of the multilayer stacked structure 1, a second enclosing layer 22 contacting the first enclosing layer 21 so as to enclose the first enclosing layer 21, and a third enclosing layer 23 contacting the second enclosing layer 22 so as to enclose the second enclosing layer 22. In addition, the first enclosing layer 21, the second enclosing layer 22 and the third enclosing layer 23 may be a sliver layer (Ag), a nickel layer (Ni) and a stannum layer (Sn), but that is merely an example and is not meant to limit the instant disclosure.

In conclusion, referring to FIG. 1 to FIG. 8, the instant disclosure provides a method of manufacturing a thin film capacitor Z, comprising the following steps: first, placing a carrier substrate 10 on a processing machine M, the processing machine M including a plurality of processing units R sequentially arranged along a planar production line, and each processing unit R having a metal-layer forming module X and an insulation-layer forming module Y; next, forming a plurality of metal layers 11 by the metal-layer forming module X of the at least one processing unit R, and forming a plurality of insulation layers 12 by the insulation-layer forming module Y of the at least one processing unit R, in which the metal layers 11 and the insulation layers 12 are alternately stacked on the carrier substrate 10 to form a multilayer stacked structure 1; and then forming two terminal electrode structures 2 to respectively enclose two opposite side end portions 20P of the multilayer stacked structure 1. Therefore, as shown in FIG. 8, the instant disclosure provides a thin film capacitor Z, comprising a multilayer stacked structure 1 and two terminal electrode structures 2. The multilayer stacked structure 1 is formed or manufactured by a processing machine M, and the multilayer stacked structure 1 includes a carrier substrate 10, a plurality of metal layers 11 and a plurality of insulation layers 12, and the metal layers 11 and the insulation layers 12 are alternately stacked on the carrier substrate 10. In addition, the two terminal electrode structures 2 are used to respectively enclose two opposite side end portions 20P of the multilayer stacked structure 1.

Please note that the processing machine M includes at least one processing unit R in another embodiment of the instant disclosure. The at least one processing unit R has a metal-layer forming module X and an insulation-layer forming module Y that are arranged along a planar production line, and the planar production line may be a planar annular production line.

Figure 9:
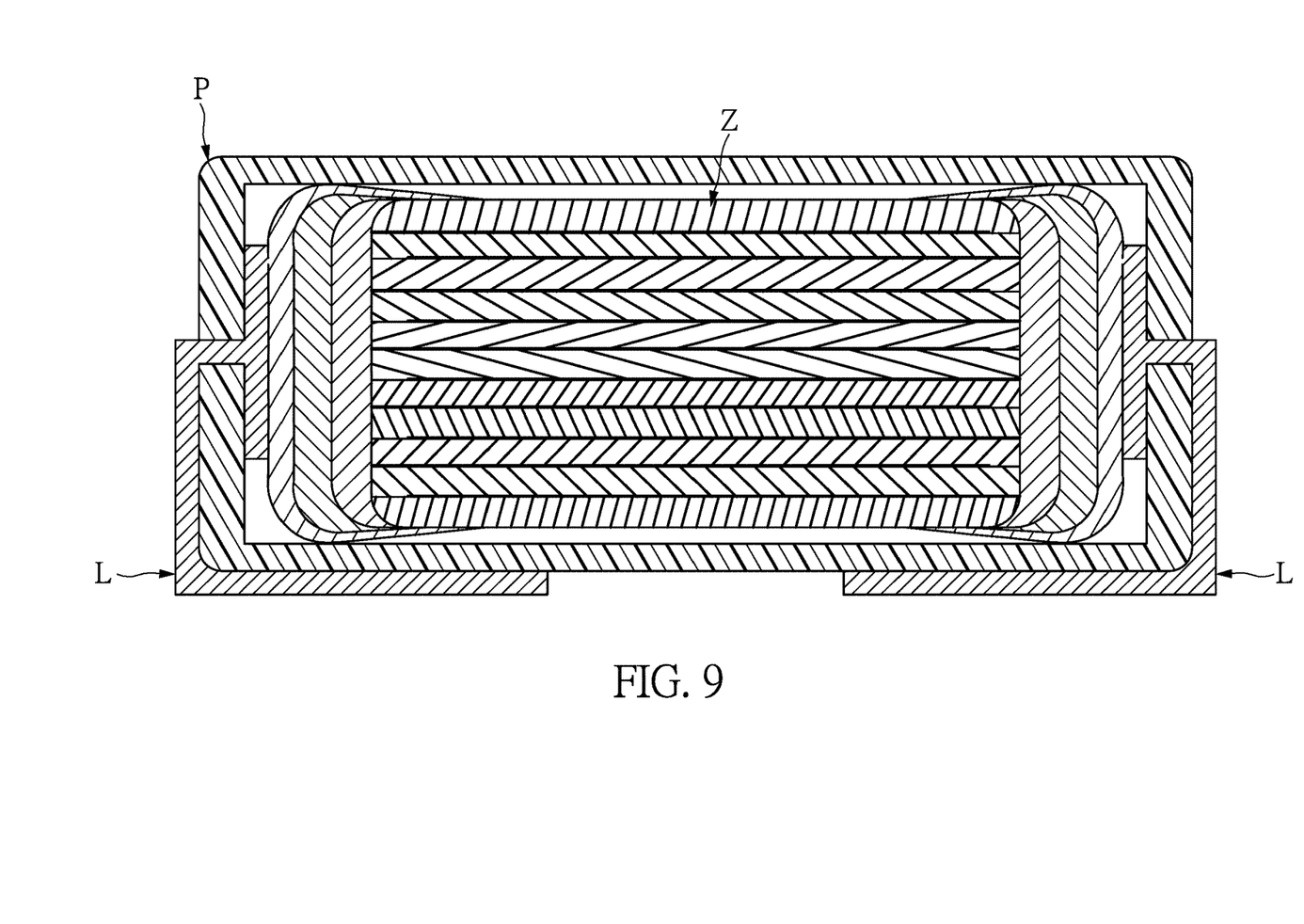
FIG. 9 shows a cross-sectional, schematic view of the thin film capacitor applied to a first type of thin film capacitor package structure according to the instant disclosure.
Figure 10:
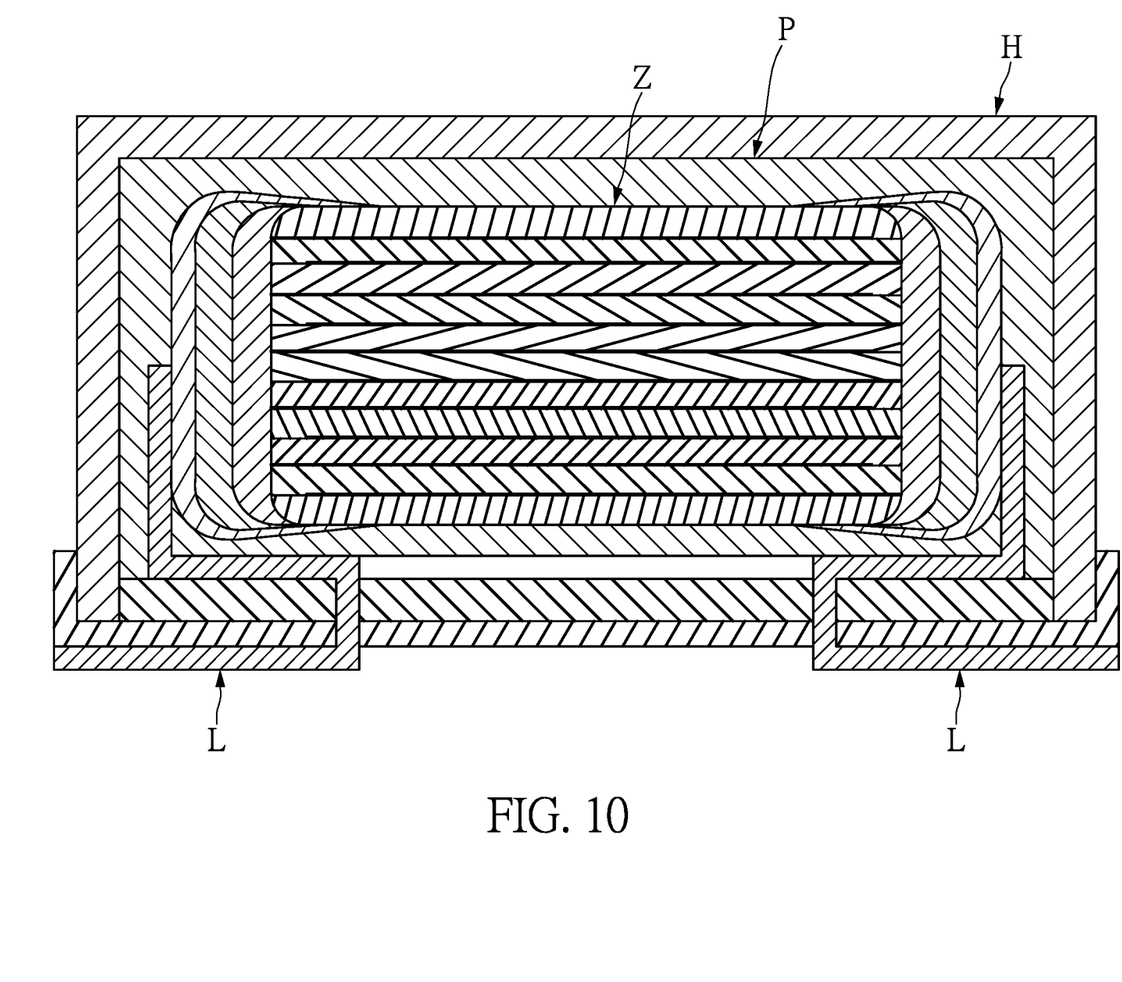
FIG. 10 shows a cross-sectional, schematic view of the thin film capacitor applied to a second type of thin film capacitor package structure according to the instant disclosure.

For one example, referring to FIG. 8 and FIG. 9, the thin film capacitor Z can be enclosed by a package body P (such as an insulation package body) in advance, and then two conductive pins L electrically contacting the thin film capacitor Z are extended from the thin film capacitor Z to the exterior of the package body P so as to finish a thin film capacitor package structure. In addition, for another example, referring to FIG. 8 and FIG. 10, the thin film capacitor Z can be enclosed by a package body P (such as an insulation package body) in advance and the thin film capacitor Z with the package body P is received inside a metal casing H (such as an aluminum casing), and then two conductive pins L electrically contacting the thin film capacitor Z are extended from the thin film capacitor Z to the exterior of the metal casing H so as to finish another thin film capacitor package structure. That is to say, the multilayer stacked structure 1 and the two terminal electrode structures 2 are enclosed by a package body P, and two conductive pins L respectively electrically contact the two terminal electrode structures 2 and are exposed from the package body P. However, the aforementioned description for the thin film capacitor package structure is merely an example and is not meant to limit the instant disclosure.

In conclusion, the metal layers 11 and the insulation layers 12 are alternately stacked on the carrier substrate 10 to form the multilayer stacked structure 1 of the thin film capacitor Z due to the features of "the processing machine M including a plurality of processing units R arranged along a planar production line" and "each processing unit R having a metal-layer forming module X for forming the metal layer 11 and an insulation-layer forming module Y for forming the insulation layer 12".

The aforementioned descriptions merely represent the preferred embodiments of the instant disclosure, without any intention to limit the scope of the instant disclosure which is fully described only within the following claims. Various equivalent changes, alterations or modifications based on the claims of the instant disclosure are all, consequently, viewed as being embraced by the scope of the instant disclosure.

What is claimed is:
1. A method of manufacturing a thin film capacitor, comprising:
placing a carrier substrate on a processing machine, wherein the processing machine includes a plurality of processing units sequentially arranged along a planar production line, and each processing unit has a metal-layer forming module and an insulation-layer forming module;
coating a first metal layer on the carrier substrate by the metal-layer forming module of a first processing unit of the processing units;
coating a first insulation layer on the first metal layer to cover the first metal layer by the insulation-layer forming module of the first processing unit;
coating a second metal layer on the first insulation layer by the metal-layer forming module of a second processing unit of the processing units;
coating a second insulation layer on the second metal layer to cover the second metal layer by the insulation-layer forming module of the second processing unit;
coating a third metal layer on the second insulation layer by the metal-layer forming module of a third processing unit of the third processing units;

coating a third insulation layer on the third metal layer to cover the third metal layer by the insulation-layer forming module of the third processing unit to form a multilayer stacked structure including the first metal layer, the first insulation layer, the second metal layer, the second insulation layer, the third metal layer, and the third insulation layer; and forming two terminal electrode structures to respectively enclose two opposite side end portions of the multilayer stacked structure.

2. The method of claim 1, wherein each metal-layer forming module includes a metal coating module and a first curing module, and each insulation-layer forming module includes an insulation coating module and a second curing module.

3. The method of claim 2, wherein the step of coating the first metal layer on the carrier substrate by the metal-layer forming module of the first processing unit further comprises:

coating the first metal layer on the carrier substrate by the metal coating module of the first processing unit; and curing the first metal layer by the first curing module of the first processing unit.

4. The method of claim 2, wherein the step of coating the second metal layer on the first insulation layer by the metal-layer forming module of a second processing unit further comprises:

coating the second metal layer on the first insulation layer by the metal coating module of the second processing unit; and curing the second metal layer by the first curing module of the second processing unit.

5. The method of claim 2, wherein the step of coating the third metal layer on the second insulation layer by the metal-layer forming module of a third processing unit further comprises:

coating the third metal layer on the second insulation layer by the metal coating module of the third processing unit; and curing the third metal layer by the first curing module of the third processing unit.

6. The method of claim 2, wherein the step of coating the first insulation layer on the first metal layer to cover the first metal layer by the insulation-layer forming module of the first processing unit further comprises:

coating the first insulation layer on the carrier substrate to cover the first metal layer by the insulation coating module of the first processing unit; and curing the first insulation layer by the second curing module of the first processing unit.

7. The method of claim 2, wherein the step of coating the second insulation layer on the second metal layer to cover the first metal layer by the insulation-layer forming module of the first processing unit further comprises:

coating the first insulation layer on the first metal layer to cover the first metal layer by the insulation coating module of the first processing unit; and curing the first insulation layer by the second curing module of the second processing unit.

8. The method of claim 2, wherein the step of coating the third insulation layer on the third metal layer to cover the third metal layer by the insulation-layer forming module of the third processing unit further comprises:

coating the third insulation layer on the carrier substrate to cover the third metal layer by the insulation coating module of the third processing unit; and curing the third insulation layer by the second curing module of the third processing unit.

9. The method of claim 1, wherein the processing machine includes a transmission mechanism for linearly driving the carrier substrate to sequentially pass through the processing units, and each processing unit is placed in a room temperature environment.

10. The method of claim 1, wherein each terminal electrode structure includes a first enclosing layer for enclosing the side end portion of the multilayer stacked structure, a second enclosing layer for enclosing the first enclosing layer, and a third enclosing layer for enclosing the second enclosing layer.

* * * * *